Figure 5:
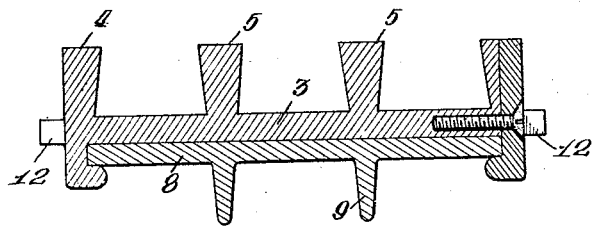
Figure 6:
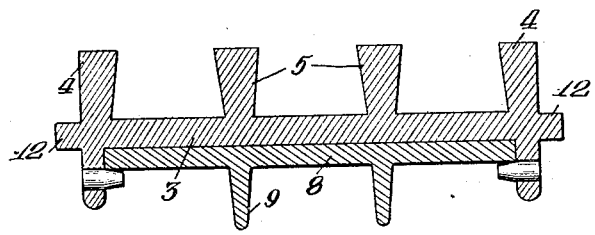
Figure 7:
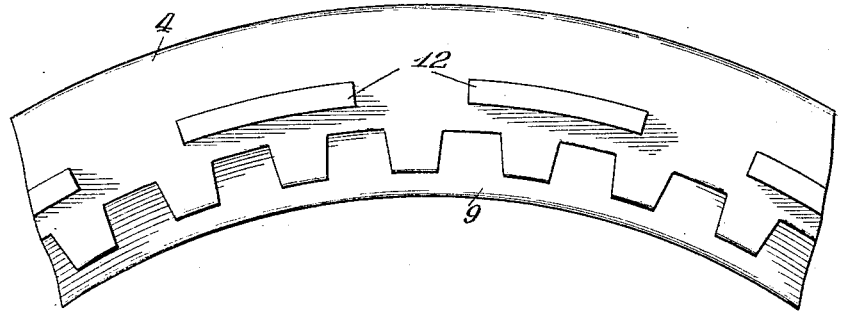

F. A. FROMMANN.
VEHICLE WHEEL RIM.
APPLICATION FILED DEC. 4, 1912.
1,197,814.
Patented Sept. 12, 1916.
2 SHEETS—SHEET 1.
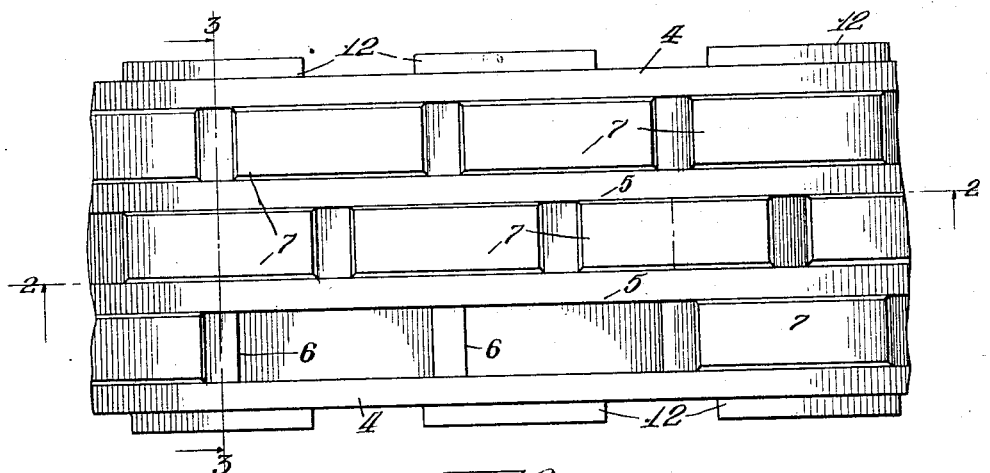
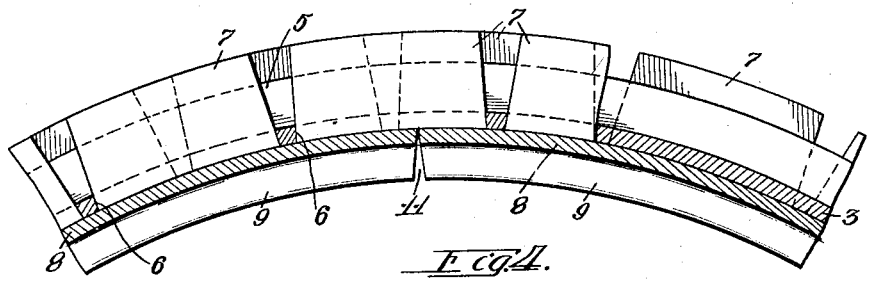
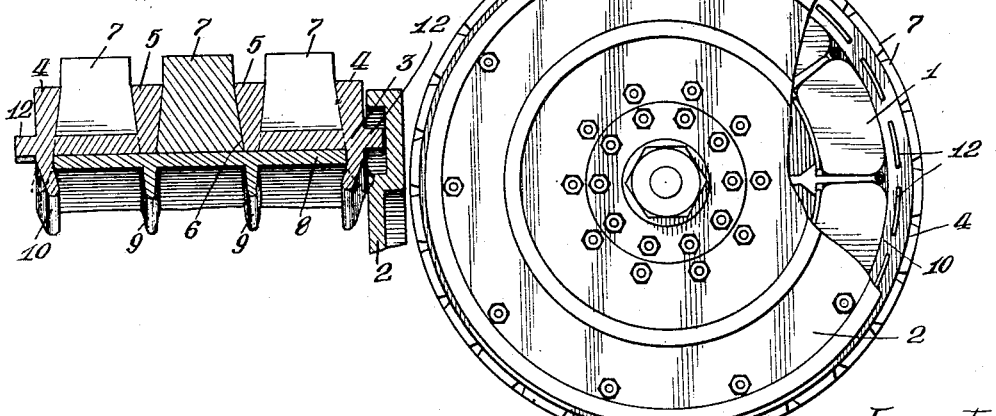
Witnesses:
Inventor:
Franklin A. Frommann
by Rudolph M. Fox
Attorney.

F. A. FROMMANN.
VEHICLE WHEEL RIM.
APPLICATION FILED DEC. 4, 1912.

1,197,814.

Patented Sept. 12, 1916.
2 SHEETS—SHEET 2.

Witnesses:
R. L. Farrington
G. W. Branning

Inventor:
Franklin A. Frommann
by Rudolph M. Po
Attorney.

UNITED STATES PATENT OFFICE.

FRANKLIN A. FROMMANN, OF CHICAGO, ILLINOIS, ASSIGNOR TO OLIVE FROMMANN, OF CHICAGO, ILLINOIS.

VEHICLE-WHEEL RIM.

1,197,814.      Specification of Letters Patent.      Patented Sept. 12, 1916.

Application filed December 4, 1912. Serial No. 734,876.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheel Rims; and I do hereby declare the following to be a full, clear, and exact description of the invention, such as will enable others skilled in the art to which it appertains to make and use the same.

My invention relates to rims or tires for vehicle wheels and particularly to the rims or tires used upon the wheels of heavy self-propelled vehicles, such as automobile trucks. It is especially adapted for use with wheels having the rim or tire formed as an integral unit mounted in yielding relation with the rest of the wheel structure and capable of radial movement relatively thereto. Wheels of this type are shown and described in Letters Patent No. 1009062 granted to me on the 21st day of November, 1911.

The object of my invention is to provide a rim or tire in which a plurality of tread blocks are held in rigid relation to the rim; one which may easily be taken apart for the removal and replacement of the tread blocks; also one which is readily secured in operative position relatively to the rest of the wheel structure.

A further object of my invention is to provide a rim or tire of the general class described which, when assembled, will be sufficiently strong and durable to withstand the strains to which tires are subjected on vehicles used for heavy haulage; also one which will be sufficiently rigid and unyielding to act as an integral part of the wheel structure; so as to permit the cushioning members of the wheel to be utilized to their best advantage.

I accomplish these objects by the construction shown in the accompanying drawings, in which—

Figure —1— is a fragmentary plan view of the tread portion of a rim and tire embodying my invention. Fig. —2— is a detail vertical sectional view of the same on the line 2—2 of Fig. —1—. Fig. —3— is a detail transverse section of the same on the line 3—3 of Fig. —1—. Fig. —4— is a view in side elevation of an entire wheel showing a tire embodying my invention mounted therein, a part of one of the side plates of the wheel being broken away to expose a side edge of the tire to view. Figs. —5— and —6— are views similar to Fig. —3— showing modified forms of construction. Fig. —7— is a view similar to a portion of Fig. —4—, showing a modified construction of the side flanges used in a wheel equipped with the rim of my invention.

In Fig. —4— of the drawings, I have shown, more or less digrammatically, a wheel of the character to which the tire construction of the present invention is particularly adapted, the said wheel being provided with a hub member and a pair of side plates rigidly secured to the hub member. Disposed about the hub member and suitably supported thereon are a plurality of rubber or other cushion blocks 1 on which the said rim or tire is carried and by means of which it is maintained normally concentric with the hub member. The said cushions 1 are annularly disposed about the hub and held in place between the side plates 2, which side plates are suitably secured by means of bolts or similar fastenings to the hub member. Particular description of the coöperating disposition of the cushioning members shown in the drawings is omitted here, as the same is fully described and claimed in my copending application, filed of even date herewith as Serial No. 734,875.

In the embodiment of my invention here particularly pictured, the tire comprises a ring member consisting of an annular tire 3 provided upon its side edges with annular flanges 4, and also provided at intervals between its side edges with radially outward projecting annular flanges 5. The side flanges 4 are provided with beveled inner faces and are thicker along their peripheral edges than at their bases or junctures with the tire 3. The flanges 5 are similarly provided with beveled faces facing the beveled faces of the flanges 4 and also facing similar faces of the other flanges 5. The tire 3 is thus provided on its periphery with a plurality of annular grooves which are dove-tail-shaped in cross section, as particularly shown in Fig. —3—. At the bottom of each of these annular grooves and at regular intervals circumferentially of the tire member 3, the latter is provided with openings 6 through which tread blocks 7 are adapted to project. These tread blocks are also provided with beveled side faces and are adapted to be driven through said openings into said grooves and between the oppositely inclined faces of the flanges 4 to 5, and 5 to 5, respectively. When thus inserted, the tread blocks project at their upper and smaller ends from the tapering grooves between said flanges. The openings 6 in adjacent circumferential grooves are preferably staggered with relation to each other, so that the tread blocks 7 will project from contiguous grooves in similarly staggered relation to each other. When driven in place, the bases or inner ends of said tread blocks 7 are, or may be, cut flush with the inner face of the tire 3, thereby equalizing any differences in their length. For the purpose of holding said tread blocks against inward movement after the same have been driven into place, I provide a second ring comprising an inner rim 8 having an outer cylindrical surface, which ring fits snugly within and in contact with the inner face of the tire 3. This inner rim 8 is preferably reinforced by means of ribs or fins 9 on the inner face thereof which extend circumferentially of the same.

To prevent the inner rim 8 from moving laterally of the tire 3 (that is, in a direction parallel with the axis of the wheel) I provide the tire member 3 with a pair of annular side flanges 10 which project toward the hub of the wheel. One of these flanges 10 is preferably bent laterally inwardly of the wheel as shown at the left-hand side of Fig. —3—. The other flange is preferably bent outwardly at first, as shown in dotted lines in Fig. —3—, whereby the opening between the edges of these two flanges is made large enough to admit the width of the inner rim 8. The latter is preferably split at one point of its circumference (as shown at 11 in Fig. —2—) so that the same may, prior to being inserted between the flanges 10, be contracted by springing one of its ends inwardly past the companion end and then moving the same so that the ends of the said member 8 overlap in coiled fashion. By so doing, the inner rim 8 will be rendered of sufficiently small diameter to pass through the openings bordered by the inner edge of one of the said side flanges 10. After the inner rim 8 has thus been sprung to a smaller diameter and inserted through the said opening, it may again be expanded so as to bring its ends into their normal position as shown at 11 in Fig. —2—. By then bending both flanges 10 inwardly, as shown in full lines in Fig. —3—, the inner rim 8 will be clamped between these flanges and the tire 3, whereby any relative movement of the members 3 and 8 (except circumferentially of each other) will be obviated. Furthermore, by bending the side flanges 10 inward with considerable pressure, they may be made to grip the inner rim 8, so as to prevent the latter from creeping or sliding with a circumferential movement relatively of the web 3. However, I have found it preferable not to depend upon such a gripping of the inner rim for restricting the circumferential movement of the rim relatively of the wheel as a whole. For the latter purpose, I preferably provide lateral projections 12 upon the side edges of the annular web or tire 3. I also provide grooved recesses 13 in the peripheral edge portion of the side plates 2, these recesses 13 being of a greater depth radially of the plates 2 than the thickness of the projections 12 which protrude into the same, thereby permitting the projections to move somewhat radially of the wheel within the said recesses. The recesses or grooves 13 are also slightly greater in length than the said projections, thereby allowing the latter to move to a limited extent circumferentially of the side plates 2. By thus restricting the motion of the web 3 (and therefore of the tire or rim as a whole) relatively to the side plates 2 of the wheel, the tire as a whole is permitted a sufficient radial movement to permit of utilizing the full cushioning effect of the rubber cushions 1; yet the tire is limited by the coöperating formations upon the web and the side plates to a very slight creeping or slipping circumferentially of the wheel, thereby permitting the full tractive power of the latter to be employed.

In the embodiment shown in Fig. —2—, the tire member 2 is made of metal having sufficient ductility to permit the flanges 10 to be bent outwardly a number of times for the removal of the inner rim 8, (which latter must be taken out when the tread blocks are to be replaced) and of again bending the said flanges inwardly to hold the inner rim 8 in place after the tread blocks 7 have been renewed in the same. However, if the wheel is to be used under severe conditions of service in which the tread blocks need to be frequently replaced, the construction may be modified as in Fig. —5—. This shows an alternative form in which a removable piece 14 is substituted for one of the integrally united flanges 10 of the annular web or tire 3. In this case the removable ring 14 may be secured in position by screws, bolts or other suitable fastening devices.

The construction may also be modified as shown in Fig. —6— in which the inwardly depending flanges 15 are integral with the tire 3 and inflexible, but are perforated to allow retaining pins to be driven through them. These pins 16 are preferably slightly tapered, so that they will force the inner rim 8 outwardly against the tire 3 when the pins are driven into place, thereby holding the rim 8 in the expanded position in which it forms a firm base for the various tread blocks. By removing the pins, the inner rim can be sprung out when it becomes necessary to renew part or all of the tread blocks.

A further modification is illustrated in Fig. —7—, in which the continuous flanges 10 are shown as replaced by a flange having a large number of inward projections 17, which will be easier to bend back and forth than a continuous flange 10. In using this alternative form, only a part of the projections 17 (say every third one) would be bent inwardly after the inner rim is inserted. Then after these projections are weakened by repeatedly bending them back and forth to permit of the removing and replacing of the inner rim, another series of the projections may be employed as retaining prongs, and so on.

While I have shown and described my invention in its preferred embodiment, I do not wish to be limited to the particular details as herein disclosed, as it will be obvious that numerous changes may be made in the same without departing from the spirit of my invention. For example, while I preferably use part or all of the inner portion of the continuous side flanges as anchoring formations for retaining the inner rim in operative position, the same underhanging effect may be produced by the removable pins as already described.

What I claim as new and desire to cover by Letters Patent is:

A wheel construction including an annular web having a plurality of perforations in its circumference; a plurality of tread blocks adapted to project outwardly through the said perforations; and a resilient split rim simultaneously engaging the inner ends of all of the said tread blocks, the ends of the said split rim normally abutting against each other; there being anchoring formations secured to the said web for retaining the said inner rim in operative position; the resiliency of the said inner rim permitting the same to have its ends sprung past each other for decreasing the diameter of the rim when the latter is to be detached.

In testimony whereof I have signed my name in presence of two subscribing witnesses.

FRANKLIN A. FROMMANN.

Witnesses:
 RUDOLPH WM. LOTZ,
 M. M. BOYLE.